(12) United States Patent
Pretterebner

(10) Patent No.: US 8,435,476 B2
(45) Date of Patent: *May 7, 2013

(54) PROCESS FOR SUPPLYING A FUEL CELL WITH HYDROGEN BY MEANS OF SILANES OR POLYSILANES

(75) Inventor: Julius Pretterebner, Oppenweiler (DE)

(73) Assignee: SPAWNT Private S.a.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 12/364,001

(22) Filed: Feb. 2, 2009

(65) Prior Publication Data

US 2009/0136800 A1 May 28, 2009

Related U.S. Application Data

(63) Continuation of application No. PCT/EP2007/006855, filed on Aug. 2, 2007.

(30) Foreign Application Priority Data

Aug. 3, 2006 (DE) .................. 10 2006 036 227
Aug. 25, 2006 (DE) .................. 10 2006 039 869

(51) Int. Cl.
C01B 33/04 (2006.01)

(52) U.S. Cl.
USPC .................................. 423/347; 423/658.2

(58) Field of Classification Search .......... 423/347, 423/658.2
See application file for complete search history.

(56) References Cited

U.S. PATENT DOCUMENTS

| | | | | |
|---|---|---|---|---|
| 3,117,838 A | * | 1/1964 | Sterling et al. | 423/335 |
| 6,758,981 B2 | * | 7/2004 | Mazza et al. | 210/774 |
| 7,306,780 B1 | * | 12/2007 | Kravitz et al. | 423/648.1 |
| 7,700,072 B2 | * | 4/2010 | Abu-Omar | 423/658.2 |
| 2002/0166286 A1 | | 11/2002 | McClaine et al. | |
| 2003/0157018 A1 | * | 8/2003 | Zaluski et al. | 423/648.1 |
| 2009/0208407 A1 | * | 8/2009 | Pretterebner et al. | 423/658.2 |

FOREIGN PATENT DOCUMENTS

| | | | |
|---|---|---|---|
| DE | 10059625 | | 5/2002 |
| DE | 601 08 744 T2 | | 3/2006 |
| DE | 10 2006 036 227.6 | * | 8/2006 |
| DE | 10 2006 039 869.6 | * | 8/2006 |
| EP | 1453130 | | 9/2004 |
| EP | 1514839 | | 3/2005 |
| JP | 73007246 | * | 9/1966 |
| JP | 59045901 | * | 3/1984 |
| JP | 2001-511429 | | 8/2001 |
| JP | 2002-154803 | | 5/2002 |
| JP | 2003-317786 | | 11/2003 |
| JP | 2003-346861 | | 12/2003 |
| WO | 84/00156 | | 1/1984 |
| WO | 01/85606 | | 11/2001 |
| WO | 02/066369 | | 8/2002 |
| WO | 2004/071946 | | 8/2004 |
| WO | 2005/005311 | | 1/2005 |
| WO | 2007/019172 | | 2/2007 |
| WO | 2008/000241 | | 1/2008 |
| WO | WO 2008/014999 | * | 2/2008 |

OTHER PUBLICATIONS

U.S. Appl. No. 60/705,331 placed in the file for applicant's convenience.*
PCT/EP2007/006855 International Search Report.
JP Office Action for JP App. No. 2009-522175, dated Jan. 4, 2013, pp. 1-10.

* cited by examiner

*Primary Examiner* — Paul Wartalowicz
(74) *Attorney, Agent, or Firm* — Brinks Hofer Gilson & Lione

(57) ABSTRACT

Process for supplying a fuel cell with hydrogen, which includes the steps:—intermediate storage of (poly)silanes or (poly)silane solutions—transfer of the (poly)silanes to a reaction chamber—reaction or hydrolysis of the silanes or silane solutions in the reaction chamber with an aqueous solution to liberate $H_2$,—removal of the solid and/or liquid reaction products from the reaction chamber,—transfer of the $H_2$ formed to the fuel cell. The invention also relates to a hydrogen generator for fuel cells based on silanes.

15 Claims, No Drawings

PROCESS FOR SUPPLYING A FUEL CELL WITH HYDROGEN BY MEANS OF SILANES OR POLYSILANES

CROSS-REFERENCE TO RELATED APPLICATIONS

This application is a continuation of International Application No. PCT/EP2007/006855 filed on Aug. 2, 2007, which claims the benefit of DE 10 2006 036 227.6, filed Aug. 3, 2006 and DE 10 2006 039 869.6, filed Aug. 25, 2006. The disclosures of the above applications are incorporated herein by reference.

FIELD

The invention concerns a process for supplying a fuel cell with hydrogen, wherein solutions storable in liquid or solid form, which split the hydrogen, are utilized as hydrogen carriers. It concerns in particular the utilization of specific materials as hydrogen storage material for supplying a fuel cell with hydrogen.

BACKGROUND

The statements in this section merely provide background information related to the present disclosure and may not constitute prior art.

The problem of storing fuel (hydrogen carrier or $H_2$) has still not been satisfactorily solved for the broad use of fuel cells, for example, in motor vehicles. Different methods for the storage of $H_2$ are known:

Pressure storage of $H_2$ in pressure vessels at up to 700 bar;
Pressureless storage as liquid $H_2$ in cryogenic dewars at temperatures of below −253° C.;
Storage in metals or metal alloys that form thermo-reversible intercalation compounds (metallic hydrides) with $H_2$;
Storage in form of hydrogen-rich organic compounds, such as, for example, methane, methanol, benzene, etc., which are subjected to a reformation reaction in order to release $H_2$;
Storage in form of $H_2O$, which is decomposed into $H_2$ with suitable metals (for example, Li, Na, K, Mg, etc.);
Storage in form of salt-like metal hydrides (for example, NaH, LiH, etc.), which are decomposed into $H_2$ with $H_2O$;
Storage in form of complex metal hydrides, for example, $LiAlH_4$, $NaBH_4$, etc., which are decomposed into $H_2$ with $H_2O$.

Most of the aforementioned methods are technically or energetically very complex, and allow only the storage of very low quantities of $H_2$, or are not controllable from the point of view of safety for broader applications.

From DE 601 08 744 T2 is known a process for producing hydrogen for a fuel cell. The process steps comprise the conversion of a metal hydride, which is different from $NaAlH_4$, with at least one alcohol, wherein hydrogen is formed, and the hydrogen is fed into a hydrogen chamber of a fuel cell. Hydrides of the metals Li, Na, K, Mg, Ca, Zr and Ti are mentioned as particularly suitable hydrides. Compounds having the formula $M2_v,M3_w,H_y$ are presented as particularly suitable complex hydrides, wherein M2 is a metal selected from among the group consisting of Li, Na, K, Mg, Ca, Fe and Zr; M3 is selected from among the group consisting of Al, B, Be and Ti.

One of the disadvantages of $H_2$ storage with the aid of metal hydrides is that metal hydrides or complex metal hydrides are solids as a rule. These solids are difficult to store, deliver and meter. They are frequently insoluble. Fueling with these substances represents already a not inconsiderable problem, in particular in motor vehicles. The delivery of metal hydride from the storage tank to a hydrogen generator that may be necessary in the motor vehicle is also difficult. A further disadvantage is that the degradation products or hydrolysis products of metal hydrides are generally highly corrosive brines, in particular LiOH, NaOH, KOH, $Ca(OH)_2$, etc. These degradation products are highly corrosive and harmful to the environment. These substances are also questionable with regard to their environmental safety because unintentional release and therefore the formation of degradation products can always be expected when these substances are utilized in large scale.

SUMMARY

The teachings of the present disclosure make available a hydrogen storage material with improved manageability with regard to storage, delivery and dosage, and also better environmental safety, as well as to disclose a suitable process for making available hydrogen for fuel cells.

This is achieved according to the present disclosure by means of a process for supplying a fuel cell with hydrogen comprising the steps of:

Temporarily storing silanes or silane solutions in liquid form;
Transferring the silanes or silane solutions into a reaction chamber;
Converting the silanes or silane solutions in the reaction chamber with an aqueous solution in order to release $H_2$;
Separating the solid and/or liquid reaction products from the reaction chamber;
Transferring the formed $H_2$ into the fuel cell having the features of claim 1, as well as by means of a process for supplying a fuel cell with hydrogen comprising the steps of:

Temporarily storing polysilanes in solid form or from polysilane solutions;
Transferring the polysilanes or polysilane solutions into a reaction chamber;
Converting the polysilanes in the reaction chamber with an aqueous solution or water vapor in order to release $H_2$;
Separating the solid and/or liquid reaction products from the reaction chamber; and
Transferring the formed $H_2$ into the fuel cell having the features of claim 2.

Another form of the present disclosure is achieved by a hydrogen generator for fuel cells as well as by utilizing silanes.

According to the present disclosure, silanes or polysilanes are utilized as storage medium for hydrogen (hydrogen storage material) or as hydrogen carriers. The silanes can be available in liquid or dissolved form, the polysilanes in solid or dissolved form. The silanes are binary compounds having the general formula $Si_nH_{2n+2}$. They are the Si analogs of alkanes.

The difference between silanes and polysilanes resides in their molecular weight or the magnitude of n, wherein those that are still liquid under normal conditions are frequently called silanes, and those that are solid are called polysilanes. The silanes with n up to about 20 are called silanes according to the invention, and the name polysilane is selected beyond that. Silanes and/or polysilanes should be understood as (poly)silanes.

It is particularly advantageous for the present disclosure if the (poly)silanes in liquid form are available in mobilized or mobilizable form. The mobilization is achieved if necessary by dissolving in a solvent. This has the advantage that an easy manageability of the hydrogen storage material is possible.

The solvent has the further advantage that it can reduce the reactivity of the silanes, and that undesirable decomposition reactions during storage are thus prevented.

However, it is also possible to use the polysilanes as solids, even though this also requires other delivery means than with the liquid variants.

The silanes can here be available in pure form. Mixtures of silanes with few mass fractions of different additives are also understood within the meaning of the invention by these. The silanes can in turn be mixtures of the different representatives of the substance class of the silanes.

Stabilizers, antioxidants or catalysts are taken especially into consideration as additives.

The silanes can also be available in solution, wherein the mentioned additives can likewise be admixed. The utilization of solvents has the advantage that the selection of suitable silanes is expanded, the mixability with additives is improved, and the storage can be improved. Solutions of polysilanes with silanes are also suitable hydrogen storage materials.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

In one form of the present disclosure, the silanes or silane solutions are temporarily stored in liquid form. Holding tanks in motor vehicles or liquid tanks in particular should be understood as temporary storage tanks. The temporary storage tank can be operated without pressure or under mild overpressure. A mild overpressure can be appropriate when volatile silanes are utilized. Pressure vessels represent preferred embodiments in particular in stationary systems or fueling systems. The overpressure is preferably limited to between 0.1 and 1 bar. However, the temporary storage tank is particularly preferably not under pressure, in particular for mobile applications, such as in motor vehicles.

The polysilanes can likewise be temporarily stored in solution.

In a further embodiment, the polysilanes are stored temporarily in solid form and are only to be mobilized in liquid form with a solvent for transfer into the reaction chamber.

In a next step, it is provided that the (poly)silanes or their solutions are to be transferred from the temporary storage tank into a reaction chamber. In contrast with the solid hydrogen storage tanks, a separation between storage and hydrogen production can be carried out easily here. This is of particular interest with regard to the separation of the reaction products arising during hydrogen production.

The reaction chamber can be configured, for example, as a continuous reactor, in particular as a continuous flow reactor. The silane or silane solution can be added into a reaction chamber filled with aqueous solution, but can also be placed in the reaction chamber and water or aqueous solution can be added.

The hydrolysis or conversion of the (poly)silanes takes placed with an aqueous solution in the reaction chamber. The silanes or polysilanes are hydrolyzed herein while forming silicic acids and releasing $H_2$. The silicic acids can occur in different forms depending on the hydrolysis degree and pH value. It is possible in this way, for example, to obtain colloidal dissolved silicic acids or silica sols or also to form solid $SiO_2$ with corresponding intermediate forms.

Alkaline pH values are preferably adjusted, in particular by means of NaOH, which make possible the formation of silica sols or dissolved silicic acids.

The temporary storage tank and reaction chamber can also be constructively consolidated in the event of solid polysilanes. This means that the aqueous solution is guided across or through the polysilane and hydrogen and the reaction products are formed. The reaction products are suitably separated thereafter from the polysilanes that are insoluble in water as colloidal dissolved silicic acids or silica sols in liquid form and are washed out of the reaction chamber/temporary storage tank.

The separation of the solid and/or liquid reaction products from the reaction chamber is carried out in the next step.

In a process of the present disclosure, it is desirable that the formed hydrolysis products be easy to separate from the system. The process has a particularly simple configuration in particular with regard to the solid hydrogen storage materials. If the formed silicic acid precipitates as colloidal solution, then it can be discharged from the reaction chamber, for example, with excess reaction water. This takes place particularly easily in a continuous flow reactor. The solid silicic acid can also be flushed out of the reaction chamber by means of water. It may also be practical to mechanically remove the solid reaction products.

The separation of the silicic acid from the solid polysilanes is carried out in one form by flushing with alkaline aqueous solution.

The hydrogen formed is transferred into the fuel cell or into the fuel cell unit, in one form, at temperatures above about 80° C.

The silanes or (poly)silanes are typically transferred in liquid form into the reaction chamber.

In a further variant, it is provided that the silanes or part of the silanes are caused to evaporate directly ahead of or in the reaction chamber. A vaporizer can be provided if necessary between the reaction chamber and the temporary storage tank.

Evaporation is particular appropriate when volatile silanes are utilized. The reaction energy released during the hydrolysis of the silanes can be advantageously utilized to evaporate the silanes.

The silanes are preferably selected from among linear or branched silanes having the general formula $Si_nH_{2n+2}$, wherein n=1, 2, 3, 4, 5, 6, 7 or 8.

$Si_3H_8$ and n-$S_4H_{10}$ or i-$S_4H_{10}$ are liquid at room temperature and are used particularly well therefore in pure form, especially with admixtures of stabilizers. The addition of stabilizers against oxidation and hydrolysis during storage is appropriate in this connection.

Silanes that are liquid at room temperature are preferably utilized as hydrogen storage material to supply a fuel cell with hydrogen.

$Si_3H_8$ is particularly preferred as hydrogen storage material for supplying a fuel cell with hydrogen.

Preferred mixtures of pure silanes comprise $Si_3H_8$ and n-$S_4H_{10}$ or i-$S_4H_{10}$ in proportions of 1:1 to 1:20.

$Si_2H_6$ has a boiling point of −14° C. and must be kept under mild overpressure when used in pure form. It is however also suitable as minor constituent in a silane mixture or silane solution with heavy homologous silanes. It acts herein as a diluter or liquefier.

Further preferred mixtures of pure silanes consist of $Si_2H_6$, $Si_3H_8$ and n-$S_4H_{10}$ or i-$S_4H_{10}$ in proportions of 0.5:1:1 to 0.5:1:50.

The higher homologues of the silanes with n>4 are increasingly chemically instable in pure form. They are therefore preferably used in solution and with additions of stabilizers. It may also be practical to utilize higher silanes with n>4 as minor constituents of low silanes in pure form or particularly preferably in their solution.

Among polysilanes, those are preferred with polymerization degrees n>100. n is particularly preferably on the average higher than about 500.

If a silane solution or polysilane solution is utilized, then it is preferably essentially composed of (poly)silanes and a carrier liquid of aprotic organic solvents. The organic solvents comprise mineral oils and/or alkanes with about 6 to about 14 carbon atoms. Cyclic ethers can also be suitable.

The aqueous solutions used for the conversion of (poly)silanes comprise pure water or water with additives. A class of additives is represented by low alcohols. The alcohols are also suitable for splitting the Si—H bond and releasing hydrogen. The reactivity of the alcohols and the released reaction heat is lower when compared to that of water. The reaction in the reaction chamber can be better controlled if required via mixtures of $H_2O$ and alcohols. Low alcohols, C1 to C3 alcohols, in particular methanol and ethanol are preferred.

Mineral acids or alkalis should be mentioned as further additives in the aqueous solution, which are used to adjust the pH value in the reactor to acid or alkaline. They have a catalytic effect on the hydrolysis of (poly)silanes. Alkaline conditions are preferably adjusted, for example, by utilizing sodium hydroxide. The reactivity of the silanes is increased in this way and the solubility of the silicic acid that forms during the hydrolysis is improved and also the formation of a liquid silica sol is promoted.

It can also be appropriate, however, to adjust to acid conditions in order to precipitate solid silicic acid or solid $SiO_2$ from the aqueous medium. This solid can then be extracted from the system by means of filter units.

Other catalysts can also be arranged in the reaction chamber. Metal catalysts, for example, steel wool, are preferred herein.

Another aspect of the present disclosure concerns a hydrogen generator for fuel cells, which comprises:
a temporary storage tank for liquid silanes, silane solutions or polysilane solutions;
a temporary storage tank for aqueous solution;
a reaction chamber into which lead at least two liquid supply lines from the two temporary storage tanks;
a separator for separating the $H_2$ gas from the solid and/or liquid reaction products.

The reaction chamber preferably contains a mixing device for liquid silane or silane solution together with the aqueous solution.

Another form of the reaction chamber is a continuous flow reactor in which the silanes or silane solution are introduced into the aqueous solution and mixed through.

A form of the hydrogen generator provides that the water formed during the fuel call reaction is fed back into the temporary storage tank, or also directly into the reaction chamber. In this way, it becomes possible to reduce the amount of temporarily stored water, since the waste water produced during the operation of the fuel cell is utilized for hydrolysis of the (poly)silanes. Another advantage of the utilization of waste water is that the water produced during the fuel cell reaction frequently precipitates as vapor or hot water, and the hydrolysis reaction can be carried out at a high temperature level in the reaction chamber without having to undertake a heating of the hydrolysis water.

The temporary storage tank and/or the reaction chamber are here connected via supply lines to the exhaust system of the fuel cell.

It should be noted that the disclosure is not limited to the embodiments described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A method for providing a fuel cell with hydrogen comprising the steps of:
    intermediate storage of a liquid, solid or dissolved hydrogen storage material selected from a group consisting of liquid silanes, liquid mixtures of silanes, liquid silane solutions, wherein in the silane solutions at least one silane is dissolved in at least one liquid solvent, polysilanes in solid form, and liquid polysilane solutions, wherein in the polvsilane solution at least one polysilane is dissolved in at least one liquid solvent,
    transfer of the hydrogen storage material from the intermediate storage to a reaction chamber,
    conversion of the hydrogen storage material in the reaction chamber with an aqueous solution with an acidic or neutral pH value or a vapor of the aqueous solution to release $H_2$,
    removal of conversion products from the reaction chamber, and
    transfer of the generated $H_2$ to the fuel cell, wherein the conversion of the silanes and/or polysilanes takes place at temperatures above about 80° C.

2. The method according to claim 1, wherein the silanes are at least in part evaporated directly before entry into or in the reaction chamber.

3. The method according to claim 1, wherein the hydrogen storage material is a binary silane.

4. A method for providing a fuel cell with hydrogen comprising the steps of:
    intermediate storage of a liquid, solid or dissolved hydrogen storage material selected from a group consisting of liquid silanes, liquid mixtures of silanes, liquid silane solutions, wherein in the silane solutions at least one silane is dissolved in at least one liquid solvent, polysilanes in solid form, and liquid polysilane solutions, wherein in the polvsilane solutions at least one polysilane is dissolved in at least one liquid solvent, and wherein the silanes and polysilanes are binary silanes,
    transfer of liquid, solid or dissolved hydrogen storage material from the intermediate storage to a reaction chamber,
    conversion of the transferred hydrogen storage material in the reaction chamber with an aqueous solution with an alkaline pH value or a vapor of the aqueous solution to release $H_2$,
    removal of conversion products, which comprises silicic acids or silica sols, as one of the group consisting of colloidal solution and suspension in aqueous solution from the reaction chamber, and
    transfer of the generated $H_2$ to the fuel cell.

5. The method according to claim 4, wherein the silane solution or polysilane solution is composed of the silanes or the polysilane and a liquid carrier comprising aprotic organic solvents.

6. The method according to claim 5, wherein the organic solvents are selected from the group consisting of mineral oils and alkanes with about 6 to about 14 carbon atoms.

7. The method according to claim 4, wherein the silanes are selected from the group consisting of linear or ramified silanes of the general formula $Si_nH_{2n+2}$, where n=1 to 8.

8. The method according to claim 4, wherein the polysilanes are selected from the group consisting of linear or ramified silanes of the general formula $Si_nH_{2n+2}$, where n is above about 100.

9. The method according to claim 4, wherein the hydrogen storage material is continuously converted in a flow reactor as a reaction chamber.

10. The method according to claim 4, wherein the conversion of the hydrogen storage material takes place in the presence of a metal catalyst, in particular steel wool.

11. The method according to claim 4, wherein the hydrogen storage material is added to a reaction chamber filled with the aqueous solution.

12. The method according to claim 4, wherein the selected aqueous solution is selected from the group consisting of water and water with lower C1 to C3 alcohols.

13. The method according to claim 4, wherein the conversion water of the fuel cell is at least in part returned to the aqueous solution for conversion with the solution selected from the group consisting of silanes and polysilanes.

14. The method according to claim 4, wherein the conversion products are removed continuously.

15. A method for providing a fuel cell with hydrogen comprising the steps of:

intermediate storage of a hydrogen storage material selected from a group consisting of silanes, mixtures of silanes, silane solutions, wherein in the silane solutions at least one silane is dissolved in at least one solvent, polysilanes in solid form, and polysilane solutions, wherein in the polysilane solutions at least one polysilane is dissolved in at least one solvent, transfer of the hydrogen storage material from the intermediate storage to a reaction chamber, conversion of the transferred hydrogen storage material in the reaction chamber with an aqueous solution or a vapor of the aqueous solution in the presence of steel wool as metal catalyst to release $H_2$, removal of conversion products from the reaction chamber, and transfer of the generated $H_2$ to the fuel cell.

* * * * *